United States Patent [19]
Ohnishi

[11] Patent Number: 5,166,572
[45] Date of Patent: Nov. 24, 1992

[54] ULTRASONIC MOTOR
[75] Inventor: Kazumasa Ohnishi, Nagaoka, Japan
[73] Assignee: Alps Electric Co., Ltd., Tokyo, Japan
[21] Appl. No.: 730,402
[22] Filed: Jul. 16, 1991
[30] Foreign Application Priority Data
Aug. 24, 1990 [JP] Japan .................. 2-223601
[51] Int. Cl.⁵ .......................... H01L 41/08
[52] U.S. Cl. .................................. 310/323
[58] Field of Search ........................ 310/323
[56] References Cited
U.S. PATENT DOCUMENTS

| | | |
|---|---|---|
| 4,453,103 | 6/1984 | Vishnersky et al. ............ 310/323 |
| 4,736,129 | 4/1988 | Endo et al. ........................ 310/323 |
| 4,739,212 | 4/1988 | Imasaka et al. .................. 310/323 |
| 4,779,018 | 10/1988 | Okuno et al. ................... 310/323 |
| 4,926,085 | 5/1990 | Sawayama et al. ............. 310/323 |
| 4,978,882 | 12/1990 | Kitani ............................... 310/323 |
| 5,013,956 | 5/1991 | Kurozumi et al. ............... 310/323 |
| 5,034,646 | 7/1991 | Shirasaki ......................... 310/323 |
| 5,066,884 | 11/1991 | Takagi et al. .................... 310/323 |

FOREIGN PATENT DOCUMENTS

| | | |
|---|---|---|
| 0017874 | 1/1990 | Japan ................................ 310/323 |
| 0017875 | 1/1990 | Japan ................................ 310/323 |

Primary Examiner—Mark O. Budd
Assistant Examiner—Thomas M. Dougherty
Attorney, Agent, or Firm—Guy W. Shoup; Norman R. Klivans

[57] ABSTRACT

A friction member which is suitable for use in supersonic motors is disclosed. The friction member is constituted of a composite material comprised of a carbon material and a mechanical strength reinforcing material. The composite material is a shaped porous sintered product containing the carbon material, which is impregnated with metals, synthetic resins or non-metallic inorganic compounds and hot pressed.

9 Claims, 3 Drawing Sheets (a) ← → (b)

ULTRASONIC MOTOR

BACKGROUND OF THE INVENTION

1. Field of The Invention

This invention relates to a ultrasonic motor and more particularly, to a friction member for use in ultrasonic motors.

2. Description of The Prior Art

This type of ultrasonic motor known in the art is, for example, a ultrasonic linear motor as shown in FIG. 1. The ultrasonic linear motor includes a pair of piezoelectric elements 1 driven with a driver D, a vibrator fixedly mounting the pair of piezoelectric elements 1 which is able to resonate with vibrations produced in the piezoelectric elements 1 and to amplify the vibrations, friction members 3, respectively, provided at opposite end portions of the vibrator 2, and a rail (a material to be driven) provided movably relative to the friction members 3.

The vibrations produced in the piezoelectric elements 1 are transmitted to the rail 4 through the vibrator 2 and the friction member 3. By this, a running body 10 (constituted of the piezoelectric elements 1, the vibrator 2 and the friction member 3 is moved relative to the rail 4 along the direction of the arrow (a)-(b).

In the above-described ultrasonic linear motor, the friction members 3 provided in sliding and relatively moving relation with the rail 4 should meet the following requirements.

The friction member or material should exhibit a good wear resistance on running of the ultrasonic motor, should not give any defects on the rail 4, should not suffer any defects on itself, and should not undergo any sticking on the rail 4 (a so-called sticking phenomenon).

The existing friction member 3 of the ultrasonic motor is mainly made of polyimide composite materials. However, such plastic materials have the drawbacks that when the temperature is elevated, the hardness of the materials is lowered, thus leading to more likelihood of sticking to the rail 4 with a greater abrasion wear.

SUMMARY OF THE INVENTION

It is accordingly an object of the invention to provide a friction material for ultrasonic motors which overcomes the drawbacks of the prior art.

It is another object of the invention to provide a friction member for ultrasonic motors which has a good wear resistance and is substantially free of any sticking (sticking phenomenon).

In a broad aspect of the invention, the above objects of the invention are achieved by an improved ultrasonic motor of the type which comprises a vibrator including at least one piezoelectric element and at least one friction member attached to the vibrator in such a way that the at least one friction member is in contact with a body to be driven wherein vibrations produced in the at least one piezoelectric element transmitted to the vibrator is transmitted to the body to be driven through the at least one friction member thereby moving the body to be driven relative to the at least one friction member, the at least one friction member being constituted of a composite material comprised of a carbon material and a mechanical strength reinforcing material.

In preferred embodiments of the invention, the composite material should be constituted of a porous sintered body containing a carbon material and impregnated with a metal as the mechanical strength reinforcing material.

Alternatively, the composite material should preferably be constituted of a porous sintered body containing a carbon material and impregnated with a synthetic resin used as the mechanical strength reinforcing material.

Still alternatively, the composite material should preferably be constituted of a porous sintered body containing a carbon material and impregnated with a non-metallic inorganic compound as the mechanical strength reinforcing material.

Yet alternatively, the composite material should preferably be constituted of a product obtained by hot pressing a mixture consisting of a carbon material and a mechanical strength reinforcing material.

The mechanical strength reinforcing material according to the broad aspect of the invention is constituted of a metallic binder and a metallic impregnating material having a melting point lower than the metallic binder and the composite material is constituted of a porous sintered body made of a carbon material and the metallic binder and impregnated with the metallic impregnating material.

According to the above embodiments of the invention, the friction member adapted for use in ultrasonic motors is made of a carbon material having good self-lubricity and a mechanical strength reinforcing material for reinforcing mechanical strength of the carbon material. In this arrangement, when the friction member is frictionally moved relative to a body to be driven or the other member, the wear member suffers little wear or abrasion loss and is substantially free of sticking to the body to be driven.

Moreover, when the friction member is made of a porous sintered body containing a carbon material and impregnated with a mechanical strength reinforcing material such as metals, synthetic resins or non-metallic inorganic compounds according to the preferred embodiments of the invention, the member can be made smooth on the surfaces thereof. By the smooth surfaces, the slidability between the friction member and the body to be driven can be improved with an improved wear resistance.

Moreover, when formed by hot pressing a mixture consisting of a carbon material and a mechanical strength reinforcing member, the friction member has a dense structure wherein the packing density of the carbon material or the mechanical strength reinforcing material.

Where the friction member is formed of a porous sintered body of a carbon material and a metallic binder, i.e. a mechanical strength reinforcing material, and impregnated with a metallic impregnating material serving also as a mechanical strength reinforcing material and having a melting point lower than the metallic binder, the carbon material is reinforced with the metallic components and the surfaces of the resultant member can be made flat by the action of the metallic components.

DESCRIPTION OF THE PREFERRED EMBODIMENTS

Figure 1:
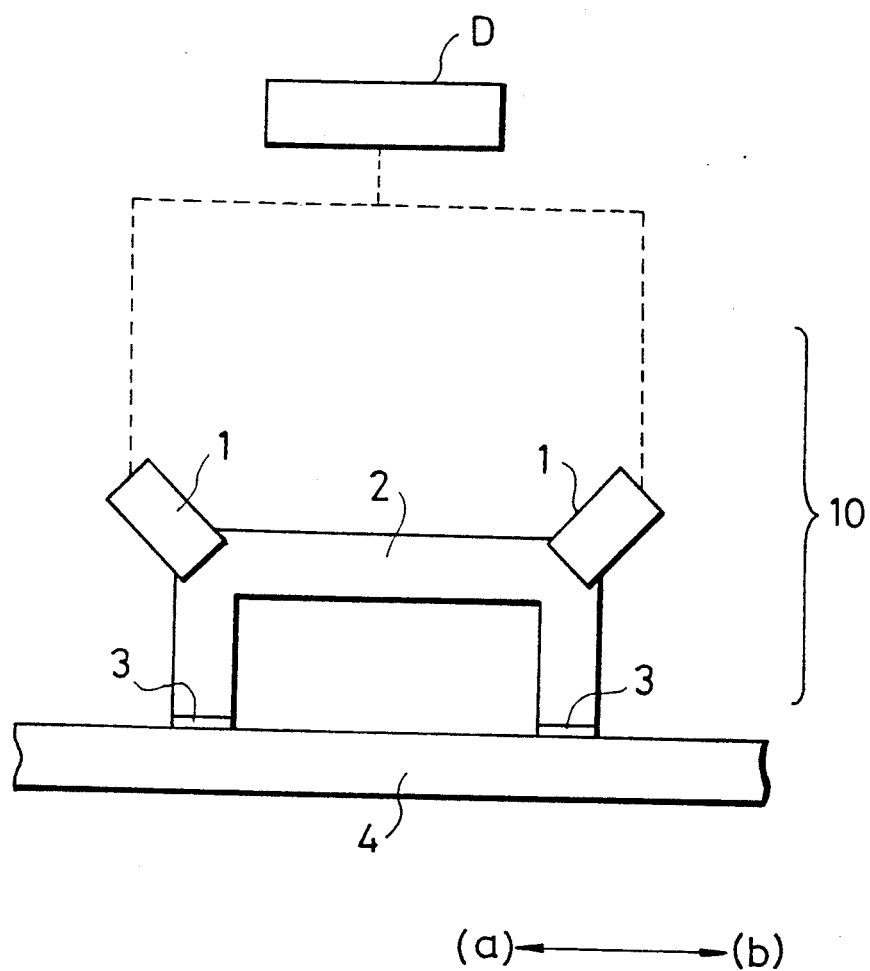
FIG. 1 is a schematic view of an ultrasonic linear motor for illustrating an arrangement to which the present invention is directed.

Reference is now made to the accompanying drawings and particularly to FIG. 1 wherein a friction member of the invention is applied to an ultrasonic linear motor.

The arrangement of the ultrasonic linear motor shown in FIG. 1 is just as described hereinbefore and is not described again. The motor is characterized in that the friction member 3 is constituted of a composite material made of a carbon material and a mechanical strength reinforcing material.

The carbon material is first described. Examples of the carbon material include graphite materials such as graphite materials, e.g. natural graphite, artificial graphite and the like, and carbonaceous materials such as coal coke, petroleum coke, carbon black, coal powder and the like. The graphite materials and the carbonaceous materials may, respectively, be used singly or in combination. As a matter of course, the graphite and carbonaceous materials may be used in combination.

These carbon materials have good self-lubricity but are not satisfactory with respect to mechanical strength. Accordingly, the friction member 3 should be made of a composite material of the carbon material and a reinforcing material for reinforcing the mechanical strength of the carbon material. Then, the mechanical strength reinforcing material is described. The mechanical strength reinforcing material may be divided into a binder and an impregnating material. These materials may be used singly or in combination.

Examples of the binder include resin binders, pitch coke binders and metallic binders. The resin binders include, for example, various thermosetting resins such as phenolic resins, divinylbenzene resins, furan resins, epoxy resins and the like, and various thermoplastic resins such as fluorine resins, polyacetal resins and the like. These resin binders may be at least partially carbonized or graphitized by thermal treatment in an inert atmosphere after binding.

The pitch coke binders include, for example, coal pitches or petroleum pitches. In this case, after binding, the pitches are fired into pitch coke.

The metallic binders include, for example, metals such as copper, nickel, iron, manganese, chromium, cobalt, titanium, molybdenum, tungsten and the like, and alloys thereof. The carbon material and the metallic binder are mixed at a given ratio. The mixture may be press molding and sintered or may be simultaneously press molded and sintered.

The composite material consisting of the carbon material and the binder may be formed with fine interstices or voids in the surface or inside of the material depending on the type of binder and/or the manner of preparation of the composite material. Although the composite material having such fine interstices or voids may be used as it is, the formation of the voids is not favorable because of the lowering of the mechanical strength of the composite material.

In order to fill the voids or interstices for increasing mechanical strength of the composite material and to impart surface flatness to the composite material, an impregnating material serving also as a mechanical strength reinforcing material is used.

The impregnating materials may be organic compounds such as synthetic resins, metals or non-metallic inorganic compounds.

Examples of the organic compound include phenolic resins, divinylbenzene resins, epoxy resins, furan resins, fluorine resins, polyethylene resins, polypropylene resins, polyamide resins and the like. Examples of the metallic impregnating material include tin, antimony, copper, zinc, silver, lead, aluminium, magnesium, cadmium and the like, and alloys thereof. The metallic impregnating material is forced into fine interstices formed in the composite material of carbon materials and binders at a temperature which is higher by about 50 to 100 C. than a melting point of the material used. If the mechanical strength reinforcing material is composed of a metallic binder and a metallic impregnating material, the metallic binder should preferably have a melting point higher by not lower than 150° C. than the metallic impregnating material.

Examples of the non-metallic inorganic compound include borosilicate glass.

The contents of the carbon material and the mechanical strength reinforcing material of the composite material used in the present invention are described.

The content of the carbon material in the composite material is generally in the range of from about 50 to 95% by volume. If the carbon content is lower than the above range, the rail 4 used as the other member or the friction members 3 themselves may suffer defects or the rail may stick to the mechanical strength reinforcing material.

On the other hand, when the content of the carbon material in the composite material exceeds about 95% by volume, the mechanical strength is not improved with a significantly great wear loss, eventually producing adverse influences such as formation of dust.

Where the composite material consisting of a carbon material and a mechanical strength reinforcing material was employed as the friction members 3 of the ultrasonic motor as shown in FIG. 1, the wear loss of the friction member 3 was found to be not larger than 10 $\mu$m per 1000 running hours. It was also confirmed that little defect of the rail 4 and the friction members themselves was found without suffering any sticking phenomenon.

The arrangement and fabrication process of the friction member 3 for the ultrasonic motor are described in (1) to (5) described below.

(1) A carbon material in the form of a fine powder classified to have a predetermined size or below is mixed with a small amount of pitch as a binder (mechanical strength reinforcing material), followed by sufficient mixing under agitation and press molding into a desired shape.

Subsequently, the press molding is sintered in an atmosphere of nitrogen at about 1100° C. and the resultant sintered product is placed in an autoclave under reduced pressure to remove the gas in the sintered product. Thereafter, a molten metallic impregnating material or mechanical strength reinforcing material such as, for example, antimony-tin, is forced into the sintered product under pressure to obtain a friction member 3.

The thus obtained friction member 3 has a content of about 85% by volume of the carbon material. The content of the metallic impregnating material is about 15% by volume. In the case, the bulk density of the friction member 3 is about 2.7 g/cm$^3$.

(2) When a divinylbenzene resin is used instead of the metallic impregnating material in (1) above for impregnation in the sintered product to obtain a friction member of the desired form. The content of the carbon material in the resulting friction member is about 85% by volume and the content of the organic compound impregnating material is about 15% by volume.

(3) 70% by volume of finely divided graphite having a size of not larger than 325 mesh and 30% by volume of finely divided copper having a size of not larger than 325 mesh are sufficiently mixed and hot pressed at a temperature not lower than the melting point of copper to obtain a friction member 3.

When the fine powders of the carbon material and the metallic binder are used as set out above, the filling density becomes so high that the friction member 3 obtained has a dense structure.

(4) Borosilicate glass is used instead of the metallic impregnating material of (1), thereby causing the glass to be impregnated in the sintered product to obtain a friction member 3 of the desired form. The content of the carbon material is about 90% by volume and the content of the non-metallic inorganic impregnating material is about 10% by volume.

(5) A finely divided carbon material and a finely divided metal (e.g. copper, nickel or an alloy thereof) are mixed and hot pressed at a temperature higher than the melting point of the metal binder to obtain a sintered product. Thereafter, the sintered product is placed in an autoclave, followed by reduction in pressure to remove the gas from the sintered product and impregnation with a fluorine resin in the form of a dispersion or solution. The friction material has a content of the carbon material of about 60% by volume.

The friction member 3 of this embodiment is applied to the supersonic linear motor shown in FIG. 1 but its application is not limited to this type of motor. For instance, the friction member is applicable to supersonic motors of the traveling wave type as is particularly set forth in Japanese Laid-open Patent Application Nos. 62-118779 (hereinafter referred to as Laid-open Application (1)), 62-244284 (Laid-open Application (2)) and 62-114481 (Laid-open Application (3)).

Figure 2:
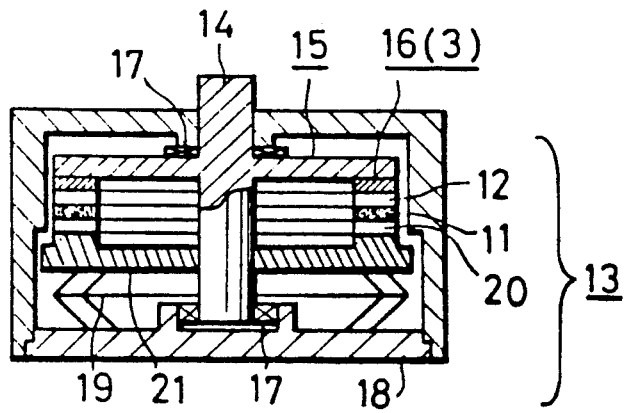
FIGS. 2 and 3, 4 and 5 to 7 are, respectively, other types of ultrasonic motors to which the friction member of the invention is applied.

The supersonic motor of the traveling wave type shown in these Laid-open Applications (1) to (3) includes, as shown in FIG. 2, a stator 13 having an piezoelectric element 11 and a vibrator 12, and a rotor 15 contacting with the stator 13 under a pressure and disposed rotatably about a shaft 14. In this arrangement, a friction member 16(3) composed of the carbon material and the mechanical strength reinforcing material may be attached to either the stator or the rotor 15.

Figure 3:
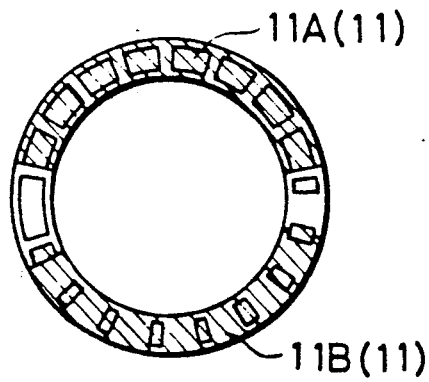

In FIG. 2, reference numeral 17 designates a bearing supporting the shaft 14 rotatably with respect to an apparatus body, reference numeral 19 designates a flat head spring which forces the rotor 15 against the stator 13 at a given pressure, and reference numeral 20 designates an absorber. Reference numeral 21 designates a mount with which the piezoelectric element 11 on the absorber 20 is mounted on the apparatus body 18 through the flat head spring 19. Among those motors of the Laid-open Applications (1) to (3), the supersonic motor of the traveling wave type disclosed in the Laid-open Application (2) includes, as shown in FIG. 3, a first piezoelectric element 11A to which an AC signal voltage is applied, and a second piezoelectric element 11B to which any signal is applied from outside and wherein a second stationary wave having a shifted phase is energized by means of a first stationary wave energized in the first piezoelectric element 11A. By this arrangement, a drive circuit can be simplified.

The friction member 3 described in this embodiment is applicable not only to those motors stated in the Laid-open Applications (1) to (3), but also to a supersonic motor described in Japanese Patent Application filed on Jul. 16, 1990, a piezoelectric actuator described in Japanese patent Application filed on Aug. 16, 1990 (hereinafter referred to simply as Patent Application (3)) and a supersonic motor described in Japanese Patent Application filed on Aug. 24, 1990, all assigned to the present applicant.

Figure 4:
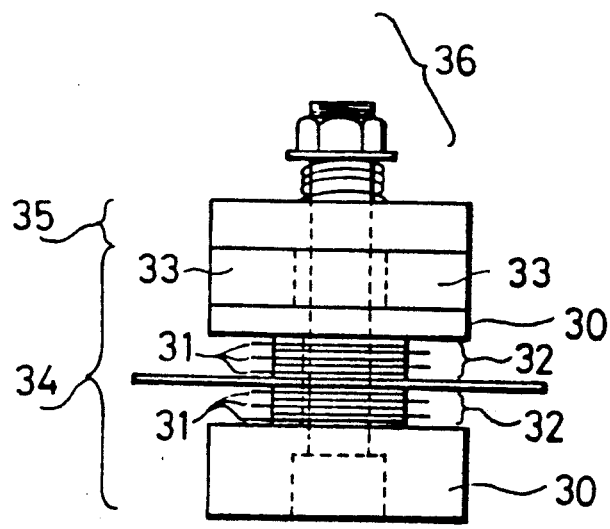

The supersonic motor in the Patent Application filed on Jul. 16, 1990 and the piezoelectric actuator in the Patent Application filed on Aug. 16, 1990 (Patent Application (3)) include, as shown in FIG. 4, a stator 34 which includes a pair of cylindrical vibrators 30, 30, a plurality of electrodes 31 and a plurality of piezoelectric elements 32 which are alternately superposed and placed between the paired cylindrical vibrators while fixing at one end side of the superposed piezoelectric elements, and a longitudinally deflecting piezoelectric element 33 which is provided at the other end side and is deflectable in an axial direction, a rotor 35 provided in contact with the longitudinally deflecting piezoelectric element 33 of the stator 34, and a compressing means 36 for forcing the rotor 35 against the stator 34 by a given spring force. Moreover, a drive means (not shown) is provided for applying an AC voltage with a resonance frequency to the piezoelectric element 32 of the stator 34 and the longitudinally deflecting piezoelectric element 33 thereby causing resonance drive.

In the above arrangement, the friction member 3 is attached to either the rotor 35 or the stator 34 instead of the longitudinally deflecting piezoelectric element 33.

Figure 5:
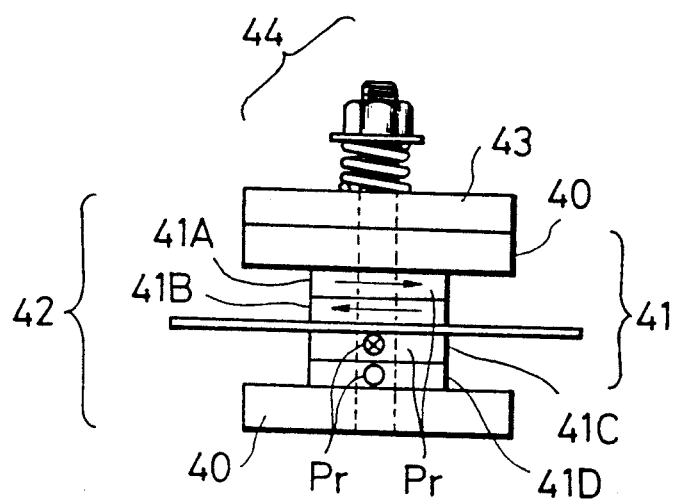

The supersonic motor described in the Patent Application filed on Aug. 24, 1990 includes, as shown in FIG. 5, a stator 42 in the form of a dumbbell as a whole which has cylindrical vibrators 40, 40 and a builtup piezoelectric body 41 having a diameter smaller than the vibrators and placed between the vibrators 40, 40, a rotor 43 rotatably provided on the upper surface of the stator, and a compressing means for forcing the rotor 43 against the stator 42 by a given spring force.

Figure 6:
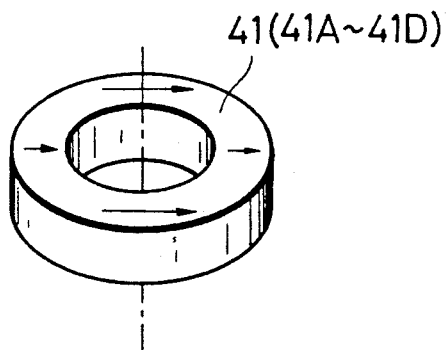
Figure 7:
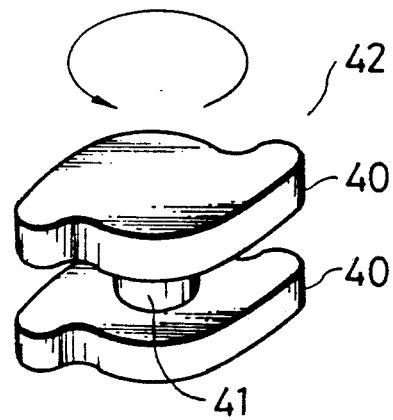

As shown in FIG. 6, the builtup piezoelectric body 41 is constituted of a plurality of piezoelectric elements 41A to 41D, which have been polarized in intended radial directions, in such a way that the polarization directions, Pr, are shifted or changed from one another. By the arrangement, the stator 42 flexural vibrations by the thickness sliding effect of the piezoelectric element 41 as shown in FIG. 7, so that the traveling wave is produced to cause the rotor 43 contacting the stator 42 to be continuously rotated in one direction. In this type of supersonic motor, the contact face of either the rotor 43 or the stator 42 is formed of the friction member 3 in the practice of the invention.

What is claimed is:

1. In an ultrasonic motor of the type which comprises a vibrator including at least one piezoelectric element and at least one friction member attached to the vibrator such that the at least one friction member is in contact with a body to be driven, wherein vibrations produced in the at least one piezoelectric element transmitted to the vibrator are transmitted to the body to be driven through the at least one friction member, thereby moving the body to be driven relative to the at least one friction member, the improvement characterized in that the at least one friction member is a composite material comprised of a carbon material and a mechanical strength reinforcing material and being mostly the carbon material by volume.

2. The ultrasonic motor according to claim 1, wherein said composite material is a porous body containing the carbon material and impregnated with a metal as the mechanical strength reinforcing material.

3. The ultrasonic motor according to claim 1, wherein said composite material is a porous body containing the carbon material and impregnated with a synthetic resin as the mechanical strength reinforcing material.

4. The ultrasonic motor according to claim 1, wherein said composite material is a porous (sintered) body containing the carbon material and impregnated with a non-metallic inorganic compound as the mechanical strength reinforcing material.

5. The ultrasonic motor according to claim 1, wherein said composite material is a mixture including the carbon material and the mechanical strength reinforcing material.

6. The ultrasonic motor according to claim 1, wherein said mechanical strength reinforcing material includes a metallic binder and a metallic impregnating material having a melting point lower than that of the metallic binder, and the composite material is a porous body of the carbon material and the metallic binder and impregnated with the metallic impregnating material.

7. In an ultrasonic motor of the type which comprises a vibrator including at least one piezoelectric element and at least one friction member attached to the vibrator such that the at least one friction member is in contact with a body to be driven, wherein vibrations produced in the at least one piezoelectric element transmitted to the vibrator are transmitted to the body to be driven through the at least one friction member, thereby moving the body to be driven relative to the at least one friction member, the improvement characterized in that the at least one friction member is a composite material comprised of a carbon material and a mechanical strength reinforcing material constituted of a metallic binder and a metallic impregnating material having a melting point lower than that of the metallic binder, and the composite material is constituted of a porous body of the carbon material and the metallic binder and impregnated with the metallic impregnating material.

8. In an ultrasonic motor of the type having a vibrator including at least one piezoelectric element and at least one friction member attached to the vibrator such that the at least one friction member is in contact with a body to be driven, vibrations produced in the at least one piezoelectric element transmitted to the vibrator being transmitted to the body to be driven through the at least one friction member, thereby moving the body to be driven relative to the at least one friction member, the improvement characterized in that the at least one friction member is a composite material comprised of a carbon material and a mechanical strength reinforcing material which is constituted of a metallic binder impregnated with a metallic impregnating material having a melting point lower than that of the metallic binder.

9. In an ultrasonic motor of the type having a vibrator including at least one piezoelectric element and at least one friction member attached to the vibrator such that the at least one friction member is in contact with a body to be driven, wherein vibrations produced in the at least one piezoelectric element transmitted to the vibrator are transmitted to the body to be driven through the at least one friction member, thereby moving the body to be driven relative to the at least one friction member, the improvement characterized in that the at least one friction member is a composite material comprised of a carbon material and a mechanical strength reinforcing material constituted of a metallic binder and a metallic impregnating material.

* * * * *